United States Patent
Chen et al.

(10) Patent No.: US 7,492,861 B2
(45) Date of Patent: Feb. 17, 2009

(54) APPARATUS AND METHOD FOR QUICK IMAGING AND INSPECTING MOVING TARGET

(75) Inventors: Zhiqiang Chen, Beijing (CN); Yuanjing Li, Beijing (CN); Yinong Liu, Beijing (CN); Junli Li, Beijing (CN); Hua Peng, Beijing (CN); Yaohong Liu, Beijing (CN); Shangmin Sun, Beijing (CN); Jinyu Zhang, Beijing (CN); Qingjun Zhang, Beijing (CN); Li Zhang, Beijing (CN); Yali Xie, Beijing (CN); Yanli Deng, Beijing (CN); Ming Ruan, Beijing (CN); Siyuan Liang, Beijing (CN); Guang Yang, Beijing (CN); Wei Jia, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 11/642,149

(22) Filed: Dec. 20, 2006

(65) Prior Publication Data
US 2008/0089476 A1 Apr. 17, 2008

(30) Foreign Application Priority Data
Oct. 13, 2006 (CN) .................. 2006 1 0113715

(51) Int. Cl.
*G01N 23/04* (2006.01)
(52) U.S. Cl. .......................................... 378/57; 378/62
(58) Field of Classification Search .................. 378/57, 378/170, 58, 62, 64, 145–153, 160; 250/505.1
See application file for complete search history.

(56) References Cited

U.S. PATENT DOCUMENTS

| 6,713,773 | B1 * | 3/2004 | Lyons et al. ............. 250/492.3 |
| 7,039,159 | B2 * | 5/2006 | Muenchau et al. ............ 378/57 |
| 7,045,787 | B1 * | 5/2006 | Verbinski et al. ......... 250/358.1 |

FOREIGN PATENT DOCUMENTS

| WO | WO 2005/098400 A2 | 10/2005 |
| WO | WO 2005/098401 A2 | 10/2005 |

\* cited by examiner

*Primary Examiner*—Irakli Kiknadze
(74) *Attorney, Agent, or Firm*—Patterson, Thuente, Skaar & Christenson, P.A.

(57) ABSTRACT

An apparatus for quick imaging and inspecting a moving target, including a passage for the moving target passing therethrough, a scanning and imaging device irradiating a radiation beam to the moving target passing through the passage to form an image thereof for inspection, a first determination unit for determining whether the moving target has entered the passage and for counting the moving target entering the passage, a second determination unit for determining the moving speed of the moving target in the passage; and a control unit for controlling the second determination unit to determine the moving speed of the moving target based on the detection signal from the first determination unit indicating the moving target having entered the passage, and for controlling the scanning and imaging device to irradiate a radiation beam for the inspection of the moving target with a frequency corresponding to the moving speed of the moving target based on the determination result of the second determination unit.

18 Claims, 2 Drawing Sheets

APPARATUS AND METHOD FOR QUICK IMAGING AND INSPECTING MOVING TARGET

RELATED APPLICATION

The present application claims priority to Chinese Application No. 200610113715.3 filed Oct. 13, 2006, which is incorporated herein in its entirety by reference.

BACKGROUND OF THE INVENTION

1. Field of the Invention

The present invention relates to a process for scanning and imaging a moving target, and, more particularly, to a process for scanning and imaging a target in a case where the target moves in an inhomogeneous speed and an incomplete quick imaging of the target is needed. Specifically, the present invention relates to an apparatus and a method for quick imaging and inspecting a moving target.

2. Brief Description of the Related Arts

An apparatus for inspecting a vehicle with high-energy radiation is a typical example of an apparatus for imaging and inspecting a moving target. For an apparatus for inspecting a vehicle with high energy radiation, usually, the driver and the passenger leaves the vehicle, a dragging device drags the inspected vehicle to move in a homogeneous speed, and an accelerator scans and images the whole vehicle at a constant frequency. The whole process requires several minutes. The cost of the apparatus is high. The vehicle inspection efficiency is low.

International patent Publication No. WO2005098400 discloses an inspecting system for inspecting an object comprising: a first source for providing a first radiation beam of specified cross-section directed in a first direction substantially transverse to the direction of motion of the object; a second source for providing a second radiation beam of specified cross-section directed in a second direction and temporally interspersed with the first radiation beam; a plurality of scatter detectors for detecting radiation beam scattered from at least one of the first and second radiation beam and for generating a radiation signal; and a controller for creating an image based on the radiation signal.

International patent Publication No. WO2005098401 discloses an automated target inspection system for inspecting a moving target comprising: a scanning zone comprising a radiation source and a radiation source detector; a first sensor component for automatically sensing when a first portion of the moving target has passed through the scanning zone and a second portion of the moving target is about to enter the scanning zone, wherein the first sensor component sends a signal to the automated target inspection system to initiate a scan of the second portion upon sensing that the second portion of the target is about to enter the scanning zone; and a shutter, triggered by a signal from the first sensor component, for allowing radiation from the radiation source to pass through the scanning zone in the direction of the radiation detector when the second portion of the moving target is passing through the scanning zone and for closing off the radiation when the second portion of the moving target is no longer within the scanning zone.

The above two inspection apparatuses both involve disadvantages existing in the prior art as mentioned above. That is, they perform scanning with a constant frequency; the inspection time is long; the cost of the apparatus is high; and the inspection efficiency for inspection of the vehicle is low.

SUMMARY OF THE INVENTION

The object of this invention is to overcome the defects of the above existing arts by providing an apparatus and a method for quick imaging and inspecting a moving target, which is able to quickly inspect a moving target moving at a speed within a predetermined range, therefore greatly reducing the inspection time.

According to another aspect of the present invention, an apparatus for quick imaging and inspecting a moving target is provided, which uses different scan-triggering conditions according to different types of a moving target.

According to a further aspect of the present invention, an apparatus for quick imaging and inspecting a moving target is provided, which can control the operating state of a scanning and imaging device according to the number of the moving targets in a passage.

According to a still further aspect of the present invention, an apparatus for quick imaging and inspecting a moving target is provided, which can protect the operator of the moving target from the radiation from the radiation beam.

To achieve the above objects of the invention, an embodiment of the present invention employs the following technical solution:

The present invention provides an apparatus for quick imaging and inspecting a moving target, comprising: a passage for the moving target passing therethrough; a scanning and imaging device irradiating radiation beam to the moving target passing through the passage to form a image thereof for inspection, a first determination unit for determining whether the moving target has entered the passage and for counting the moving target entering the passage, a second determination unit for determining the moving speed of the moving target in the passage; and a control unit for controlling the second determination unit to determine the moving speed of the moving target based on the detection signal from the first determination unit indicating that the moving target has entered the passage, and for controlling the scanning and imaging device to irradiate radiation beam for the inspection of the moving target with a frequency corresponding to the moving speed of the moving target based on the determination result of the second determination unit.

The apparatus can further comprise a third determination unit for determining the type of the moving target, the control unit controls the time at which the scanning and imaging device irradiates radiation beam based on the determined type of the moving target.

The apparatus can further comprise a fourth determination unit for determining whether the moving target has left the passage and for counting the moving target leaving the passage. The control unit places the apparatus into a standup state when determining the difference between the counting of the first determination unit and the counting of the fourth determination unit is zero.

The first determination unit of the apparatus comprises: a first ground sensing coil buried beneath the ground surface at the entrance of the passage, and first quick-responsive measuring light screens disposed at two sides of the passage used in combination with the first ground sensing coil.

The scanning and imaging device of the apparatus includes an accelerator for emitting radiation beam for scanning the moving target passing through the passage; a detector for receiving radiation penetrated through the moving target; an imaging device for forming an image based on the radiation penetrated through the moving target received by the detector; and a radiation protection device for limiting the amount of radiation in the periphery of the apparatus within a permitted range. Further, the radiation protection device includes shielding walls disposed at two sides of the passage.

A method for quick imaging and inspecting a moving target is also provided, comprising the steps of: determining whether the moving target has entered a passage; determining the moving speed of the moving target entering the passage; and irradiating radiation beam with a frequency corresponding to the moving speed of the moving target so as to perform an inspection of the moving target.

The method can further comprise: determining whether the moving target has left the passage and counting the moving target leaving the passage, wherein determining whether the moving target has entered the passage comprising counting the moving target entering the passage, comparing the counting of the moving target leaving the passage and the counting of the moving target entering the passage, and halting the irradiation of the radiation beam when the counting of the moving target leaving the passage is equal to the counting of the moving target entering the passage.

In an embodiment of the present invention, an apparatus for inspecting a moving vehicle with high energy radiation is provided, which performs inspection while the vehicle moves in a predetermined speed without requiring the driver and the passengers alighting from the vehicle. Therefore, the inspection time is greatly reduced, and the vehicle throughput is increased, thus achieving 100% inspection ratio.

The present invention employs the above technical solution, capable of increasing the vehicle throughput above 200 container lorries each hour. In comparison with the prior art, the present invention can greatly improve vehicle inspection rate; the cost of apparatus is significantly reduced; and the occupying area of the apparatus is small. Therefore, the apparatus of the present invention can be used in situations such as various kinds of road stations.

The further description of embodiments of the present invention will be made in conjunction with the detailed embodiments of the present invention and the accompanying drawings.

BRIEF DESCRIPTION OF THE DRAWINGS

The above object and advantages of the present invention will be more apparent by describing embodiments of the present invention in detail, in conjunction with the accompanying drawings, in which.

DETAILED DESCRIPTION OF THE PREFERRED EMBODIMENTS

Figure 1:
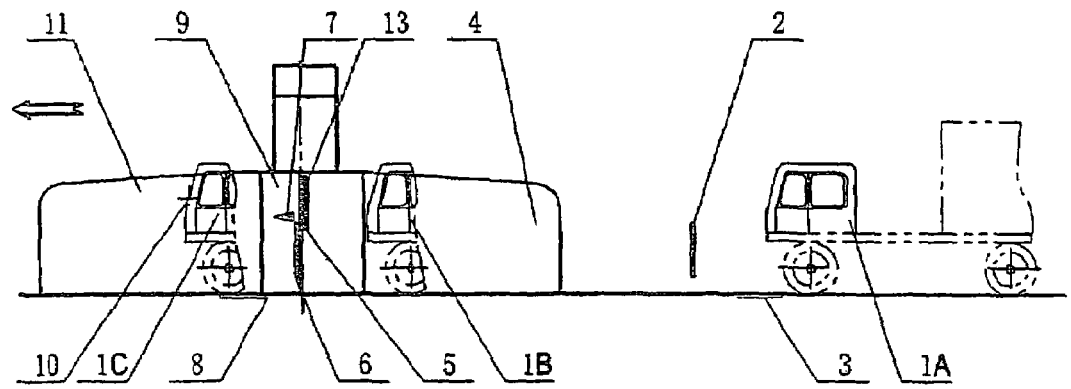
FIG. 1 is a schematic view of a vehicle inspection apparatus according to an embodiment of the present invention.

Reference will now be made in detail to embodiments of the present invention, examples of which are illustrated in the accompanying drawings, wherein like reference numerals refer to like elements throughout.

Now, the structure and operating process of the vehicle inspection apparatus according to one exemplary embodiment of the present invention will be described in detail referring to FIGS. 1 and 2.

The vehicle quick-inspection apparatus of the present invention comprises a passage 14 for a moving target to be inspected, which is loaded with containers, for example, passing therethrough, an accelerator chamber 9 in which a scanning and imaging device is installed, quick-responsive measuring light screens 2 and a ground sensing coil 3 for determining whether a vehicle has entered the passage, a speed measurement radar 7 for determining the moving speed of the vehicle, and a control room (not shown). The quick-responsive measuring light screens 2 are installed on vertical installing posts at two sides of the passage 14. The ground sensing coil 3 is buried beneath the ground surface at the entrance of the passage (on the right side in FIG. 2), serving as the first switch of the entrance for vehicle. The above two kinds of devices are used together to determine whether a moving target to be inspected has entered the passage and to count the vehicle entering the passage by a first counter (not shown). The first counter may be disposed in the quick-responsive light screens 2 and/or the ground sensing coil 3, or alternatively disposed in the control room. The speed measurement radar 7 serves to determine the moving speed of the inspected moving target, and in the present embodiment, the speed measurement radar 7 may be installed on the outer wall of the accelerator chamber 9 near the passage. The control room is electrically connected with the accelerator, the quick-responsive light screens 2, the ground sensing coil 3 and the speed measurement radar 7 so that the detected signal from the quick-responsive light screens 2, the ground sensing coil 3, and the speed measurement radar 7 can be transmitted to the control room. The control room is provided with a control unit, which is installed with control software and controls the speed measurement radar 7 to determine the moving speed of the vehicle based on the detected signal from the quick-responsive light screens 2 and the ground sensing coil 3 indicating that the vehicle has entered the passage, and controls the scanning and imaging device to inspect the vehicle with a scanning frequency corresponding to the moving speed of the vehicle based on the determined result of the speed measurement radar 7. The scanning frequency is made high when the determined moving speed of the vehicle is fast, while the scanning frequency is made low when the determined moving speed of the vehicle is slow, such that it can be ensured that the image will not be deformed.

Figure 2:
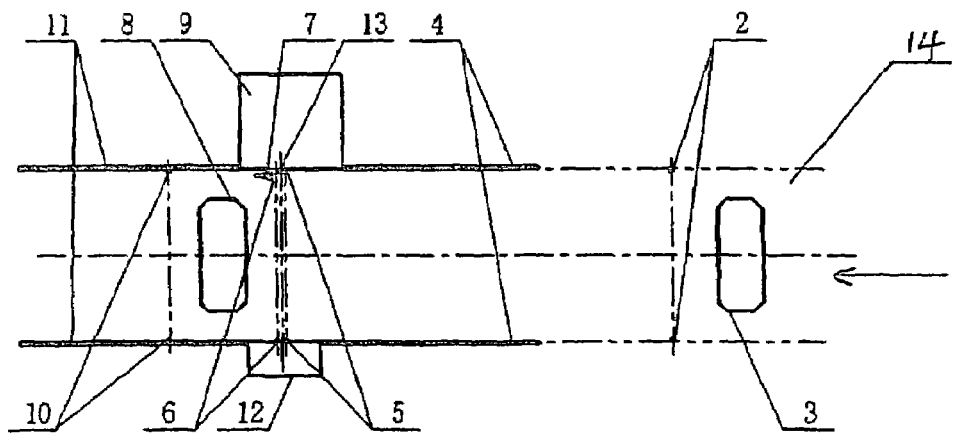
FIG. 2 is a schematic top view of the apparatus in FIG. 1.

As shown in FIGS. 1 and 2, the vehicle quick-inspection apparatus further comprises photoelectric switches 10 and measuring light screens 5 for determining the type of the vehicle. The control unit controls the triggering condition of the accelerator, for example, the time at which radiation beam is irradiated based on the determined result. The quick-responsive measuring light screens 5 are installed on the wall of the accelerator chamber 9 and the detector arm 12 at two sides of the passage 14. The photoelectric switches 10 are installed on the shielding walls 11 at two sides of the passage, respectively.

In an example in which the type of the vehicle is determined by the photoelectric switches 10 and the measuring light screens 5, the control unit is stored with information regarding the features and profile of a container lorry, a box-car, a passenger car, etc. The measuring light screens 5 for example comprise a transmitter and a receiver installed at two sides of the passage respectively. The control unit can quickly determine the type of a vehicle according to some obvious feature or part of the profile of a vehicle. When the moving target travels into an inspection area in the passage 14, the photoelectric switches 10 are enabled, and the control unit starts the measuring light screens 5 for operation. The transmitter of the measuring light screens 5 emits a certain number of beams to irradiate toward the receiver, which has corresponding number of sensors to receive the beams irradiated from the transmitter. According to the situation that the beams are blocked off, the information regarding the height of the profile of a vehicle can be detected. As the vehicle travels forward, the measuring light screens 5 continuously detect the information of the height of the vehicle and transmit the information to the control unit. The control unit converts the information transmitted from the receiver of the measuring light screens 5 into the profile of the vehicle, and compares the detected information of vehicle with the information stored in the controller so as to identify the type of the vehicle.

The vehicle quick-inspection apparatus further comprises quick-responsive measuring light screens 6 and a ground sensing coil 8 buried beneath the ground surface in the passage near the exit of the passage (see left side of FIGS. 1 and 2) for determining whether an inspected vehicle has left the passage and for counting the inspected vehicle leaving the passage by a second counter (not shown). The second counter may be disposed in the measuring light screens 6 and/or the ground sensing coil 8, or alternatively disposed in the control room.

The scanning and imaging apparatus may comprise an accelerator, a detector, an imaging device and a radiation protection device. The accelerator serves to irradiate radiation beam for scanning a moving target to be inspected, such as a vehicle. The accelerator can adjust the frequency of the radiation beam so as to control the scanning frequency of the vehicle based on the vehicle speed detected by the speed measurement radar 7 under the control of the control unit. The detector serves to receive the radiation penetrated from the moving target to be inspected. The imaging device serves to form an image based on the radiation penetrated from the inspected moving target detected by the detector. The radiation protection device serves to ensure that the amount of radiation in the periphery of the apparatus is limited within a permitted range, so that the operators that may approach the apparatus can be protected from the damage of the radiation. Further, the radiation protection device comprises shielding walls 4, 11 disposed at two sides of the passage for preventing the penetration of the radiation.

In the present embodiment, the protection walls 4, 11 are vertically installed at two sides of the passage 14 and connected with the accelerator chamber 9 and the detector arm 12 disposed at two sides of the passage respectively. The quick-responsive light screens 6 are installed on the wall of the accelerator chamber 9 and the detector arm 12 disposed at two sides of the passage 14.

The control software of the control unit is comprised of five parts, consisting of a system management module, a passage vehicle counting module, a driver automatic recognizing and dodging module, a software watchdog module and an abnormal event processing module, respectively. The system management module is in charge of coordinating the operation of the respective modules, communication with the outside and controlling the peripheral devices. The passage vehicle counting module may be associated with the first counter and the second counter for correctly counting the number of the entering vehicle and the leaving vehicle so as to count the number of vehicle in the passage. The number of the vehicles in the passage is an important reference for the system management module to perform controlling operation. The driver automatic recognizing and dodging module serves to determine the vehicle position and vehicle type. This module can correctly recognize the container lorry and the sealed truck, and the system management module performs different control to the scanning operation according to different vehicle type. The driver automatic recognizing and dodging module is built therein a safe interlock program, capable of monitoring the operation state of the accelerator while the driver is passing through the scanning zone and ensuring the safety of the driver and the passengers. The software watchdog module serves to avoid the system's abnormal state, or a state not in consistent with the actual state. The abnormal event processing module involves alarm, emergency handling, personnel intervention and the like, for processing the abnormal event.

In the above embodiment of the present invention, the quick-responsive measuring light screens 2, 5, 6 and the ground sensing coils 3, 8 are described for detecting the entering or leaving of a vehicle, respectively. However, the present invention is not limited thereto. For example, one of the measuring light screen and the ground sensing coil can be used to detect the entering and leaving of a vehicle. It is to be noted that, according to the performance or characteristics of the ground sensing coil, only when the contact area between the moving target moving in the inspection passage 14 and the ground sensing coil reaches a certain area, the ground sensing coil can generate a signal (positive signal) indicating that a moving target is detected.

Furthermore, the measuring light screens 2, 5 and 6 can be substituted with conventional photoelectric switches. Alternatively, the ground sensing coils 3 and 8 can also be substituted by at least one of the photoelectric switches, the piezoelectric detectors, the ultrasonic sensors, the microwave sensors and the pressure sensors, etc.

Figure 3:
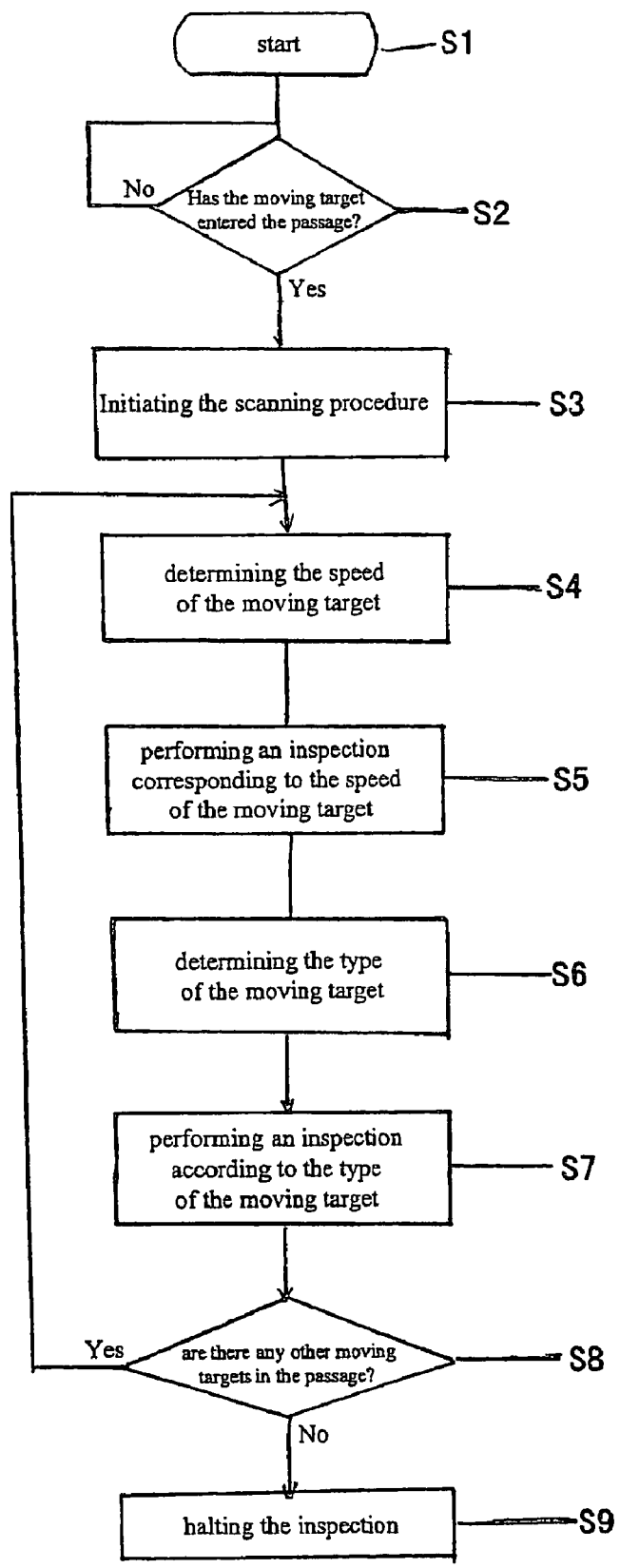
FIG. 3 is a flowchart of a method for quick imaging and inspecting a moving target according to an embodiment of the present invention.

As shown in FIG. 3, according to another aspect of the present invention, a method for quick imaging and inspecting a moving target is provided, an embodiment of which comprises the following steps: starting the inspection (S1); determining whether a moving target such as a vehicle has entered the passage (S2); if it is determined that a moving target has entered the passage, the scanning and imaging device is enabled to start the inspection procedures (S3); determining the moving speed of the moving target (S4); determining the scanning frequency for inspection of the scanning and imaging device according to the moving speed so that the inspection can be performed corresponding to the moving speed (S5).

The above method can further include the steps of: determining the type of the moving target (S6), for example, determining whether the moving target is a container lorry or a sealed truck; and performing an inspection of a predetermined type based on the determined type of the moving target (S7), that is, using different scan-triggering condition for different types of vehicles. For example, if the moving target is determined as a sealed truck, the radiation beam is emitted immediately to perform inspection; if the moving target is determined as a container lorry, the radiation beam is emitted after a certain period, and the inspection by scanning is performed after the head portion of the vehicle has left the inspection area and the containers have arrived in the inspection area.

The above method can further include the steps of: determining whether the moving target has left the passage and counting the moving target leaving the passage (S8), wherein determining whether the moving target has entered the passage comprises counting the moving target entering the passage; when the counting of the moving target leaving the passage is equal to the counting of the moving target entering the passage, the irradiation of the radiation beam is halted (S9). If there are other moving target, the inspection proceeds; otherwise, the inspection is halted.

In detail, the operation process of an embodiment of the present invention is as below:

The system is in a standup state when the number of vehicles in the passage is zero. When a vehicle 1A is moving towards the passage, the ground sensing coil 3 is firstly enabled, and cooperates with the quick-responsive measuring light screens 2 to determine the entering of the vehicle and the moving direction of the vehicle. If the vehicle enters the passage, the count of the first counter indicating the number of vehicles in the passage is increased by 1. The speed measurement radar 7 measures the moving speed of the vehicle, and the system is placed into a ready state. While the vehicle keeps moving forward, the system records the change of the state of the vehicle all the way while the vehicle is moving in the passage. When the vehicle moves at normal speeds from the speed 1A, via 1B, to 1C, the photoelectric switches 10 are effective. At this time, the control unit determines whether the vehicle to be inspected is a container lorry or a sealed truck based on the detected result of the measuring light screens 5, and different scan-triggering conditions are used for different types of vehicles.

If it is determined that the vehicle is a sealed truck, the radiation beam is emitted immediately for scanning. If it is determined that the vehicle is a container lorry, the radiation beam is emitted after a certain period, and the inspection by scanning is performed after the head portion of the vehicle has left the inspection area and the containers have arrived in the inspection area. The pulse frequency for scanning is obtained from the real time speed measurement by the real time speed measurement radar 7. The output frequency of the real time speed measurement radar 7 will vary along with variation of the moving speed of the vehicle. When the cab is passing through the scanning area, the control unit monitors the operating state of the accelerator at real time to ensure that the accelerator will not irradiate beams by mistake. When the vehicle moves away from the scanning passage, the count of the second counter indicating the number of the vehicles in the passage is increased by one. The scanning and imaging device of the inspection apparatus will remain at a scanning state as long as the count of the second counter and the count of the first counter are not equal. When the two are equal to each other, the scanning and imaging device is placed into a standup state.

It should be noted that, the various technical features included in the embodiment of the present invention can be modified or substituted by their equivalents in various manner. For example, the speed measurement radar 7 can be substituted by photoelectric switches or measuring light screens separated at a predetermined distance for measuring the speed. In summary, the technical solutions composed by any substitution which is in the general common knowledge of those skilled in the art shall fall in the scope of the present invention.

What is claimed is:

1. An apparatus for quick imaging and inspecting a moving target, comprising:
    a passage adapted for the moving target to pass therethrough;
    a scanning and imaging device irradiating a radiation beam to the moving target passing through the passage to form an image thereof for inspection;
    a first determination unit for determining whether the moving target has entered the passage and for counting the moving target entering the passage;
    a second determination unit for determining the moving speed of the moving target in the passage; and
    a control unit for controlling the second determination unit to determine the moving speed of the moving target based on the detection signal from the first determination unit indicating that the moving target has entered the passage, and for controlling the scanning and imaging device to irradiate a radiation beam for the inspection of the moving target with a frequency corresponding to the moving speed of the moving target based on the determination result of the second determination unit.

2. The apparatus according to claim 1, further comprising a third determination unit for determining the type of the moving target, the control unit controlling the time at which the scanning and imaging device irradiates radiation beam based on the determined type of the moving target.

3. The apparatus according to claim 2, wherein the third determination unit includes photoelectric switches at two sides of the passage and third quick-responsive measuring light screens used in combination with the photoelectric switches.

4. The apparatus according to claim 1, further comprising a fourth determination unit for determining whether the moving target has left the passage and for counting the moving target leaving the passage.

5. The apparatus according to claim 4, wherein the control unit places the apparatus into a standup state when determining the difference between the counting of the first determination unit and the counting of the fourth determination unit is zero.

6. The apparatus according to claim 4, wherein the fourth determination unit comprises:
    a second ground sensing coil buried beneath the ground surface in the passage close to the exit of the passage; and
    a second quick-responsive measuring light screen disposed at two sides of the passage used in combination with the second ground sensing coil.

7. The apparatus according to claim 6, wherein the detector has a detector arm, the second quick-responsive measuring light screen being disposed on the detector arm.

8. The apparatus according to claim 1, wherein the moving target is a vehicle.

9. The apparatus according to claim 1, wherein the first determination unit comprises:
    a first ground sensing coil buried beneath the ground surface at the entrance of the passage; and
    a first quick-responsive measuring light screen disposed at two sides of the passage used in combination with the first ground sensing coil.

10. The apparatus according to claim 9, wherein installation vertical posts are provided at two sides of the passage, and the first quick-responsive measuring light screens are disposed on the vertical posts.

11. The apparatus according to claim 1, wherein the second determination unit includes a speed measurement radar disposed at two sides of the passage.

12. The apparatus according to claim 1, wherein the second determination unit includes photoelectric switches separated by a predetermined distance at two sides of the passage.

13. The apparatus according to claim 1, wherein the second determination unit includes measuring light screens separated by a predetermined distance at two sides of the passage.

14. The apparatus according to claim 1, wherein the scanning and imaging device includes:
    an accelerator for emitting radiation beam for scanning the moving target passing through the passage;
    a detector for receiving radiation penetrated through the moving target;
    an imaging device for forming an image based on the radiation penetrated through the moving target received by the detector; and
    a radiation protection device for limiting the amount of radiation in the periphery of the apparatus within a permitted range.

15. The apparatus according to claim 14, wherein the radiation protection device includes shielding walls disposed at two sides of the passage.

16. A method for quick imaging and inspecting of a moving target, comprising the steps of:
    determining whether the moving target has entered a passage;
    determining the moving speed of the moving target entering the passage; and
    irradiating a radiation beam with a frequency corresponding to the moving speed of the moving target so as to perform an inspection of the moving target.

17. The method according to claim 16, further comprising:
    determining the type of the moving target and controlling the time at which radiation beam is irradiated.

18. A method for quick imaging and inspecting of a moving target, comprising the steps of:
    determining whether the moving target has entered a passage;
    determining the moving speed of the moving target entering the passage;
    irradiating a radiation beam with a frequency corresponding to the moving speed of the moving target so as to perform an inspection of the moving target;
    determining whether the moving target has left the passage and counting the moving target leaving the passage,
    wherein determining whether the moving target has entered the passage comprises counting the moving target entering the passage; and
    comparing the counting of the moving target leaving the passage and the counting of the moving target entering the passage, and halting the irradiation of the radiation beam when the counting of the moving target leaving the passage is equal to the counting of the moving target entering the passage.

* * * * *